Patented June 10, 1941

2,245,521

UNITED STATES PATENT OFFICE 2,245,521

DYESTUFFS OF THE ANTHRAQUINONE SERIES

Fritz Baumann and Heinz-Werner Schwechten, Leverkusen I. G.-Werk, Germany, assignor to General Aniline & Film Corporation, New York, N. Y., a corporation of Delaware No Drawing. Original application March 8, 1938, Serial No. 194,602. Divided and this application March 7, 1940, Serial No. 322,772. In Germany March 17, 1937

4 Claims. (Cl. 260—277)

The present invention relates to new dyestuffs of the anthraquinone-acridone series.

We have found that new dyestuffs of the anthraquinone-acridone series can be obtained by causing aromatic amines having at least one exchangeable hydrogen atom to react with α-arylamino - anthraquinone - 2.1 - (N) - 1'.2' - (N) - acridones which contain carboxylic acid groups in form of their corresponding acid halides. Preferably those α-arylamino-anthraquinone-2.1-(N)-1'.2'-(N)-acridones are used as starting materials which have the carboxylic acid group in the aryl nucleus and which correspond to the general formula

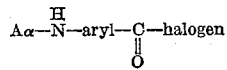

wherein A stands for an anthraquinone-benzacridone or anthraquinone-naphthacridone ring system and the Greek letter α means that the nitrogen atom is attached in alpha-position to the anthraquinone nucleus of the anthraquinoneacridone ring system. Compounds of this kind are, for instance, anthraquinone-2.1-(N)-1'.2'-(N) - benzene - acridone - 4 - [anilido - p - carboxylic acid chloride], anthraquinone-2.1-(N)-1'.2' - (N) - benzene - acridone - 4 - [anilido - m-carboxylic acid chloride], 4'-chloro- resp. 5'-chloro - anthraquinone - 2.1 - (N) - 1'.2' - (N) - benzene - acridone - 4 - [anilido - p - carboxylic acid chloride], 4'-chloro- resp. 5'-chloro-anthraquinone - 2.1 - (N) - 1'.2' - (N) - benzene - acridone - 4 - [anilido - m - carboxylic acid chloride], 3'.5' - dichloro-anthraquinone - 2.1 - (N) - 1'.2' - (N) - benzene - acridone - 4 - [anilido - p-carboxylic acid chloride], anthraquinone-2.1-(N) - 1'.2' - (N) - benzene-acridone - 5 - [anilido-p-carboxylic acid chloride], 3'.5'-dichloroanthraquinone - 2.1 - (N) - 1'.2' - (N) - benzene - acridone - 5 - [anilido - p - carboxylic acid chloride], 5' - chloro-anthraquinone - 2.1 - (N) - 1'.2' - (N) - benzene - acridone - 8 - [anilido - m-carboxylic acid chloride], and anthraquinone-2.1 - (N) - 1'.2' - (N) - naphthacridone - 5 - [anilido-p-carboxylic acid chloride].

The α - aryl - amino - anthraquinone - 2.1 - (N)-1'.2'-(N)-acridone- carboxylic acids used as starting materials can be obtained, for example, by reacting an α-amino-anthraquinone-2.1-(N)- 1'.2'-(N)-acridone upon a halogen-aryl-carboxylic acid ester, as, for instance, a p-, m- or o-halogen benzoic acid methyl- or ethyl-ester or a halogen-naphthoic acid ester. In the reaction product thus obtained the acid ester group is saponified in the usual way, and the carboxylic acid so formed is treated with agents being capable of forming acid halides such as thionyl-chloride.

Another type of starting materials is obtained by causing anthraquinone-1.4-dihalogen-2-carboxylic acids to react with 1 mol of an aminobenzoic acid ester, whereby an anthraquinoneacridone ring system is formed, and then replacing the halogen atom in 4-position by an aryl-amino radical. The ester obtained is saponified to the carboxylic acid and the carboxylic acid group is transformed into the acid chloride group. By this way also dicarboxylic acids can be obtained either by causing 1.4-dihalogenanthraquinone-2-carboxylic acids to react at first with at least 2 mols of an amino-benzoic acid ester or successively with 1 mol of two different amino-benzoic acid esters.

As amines having at least 1 exchangeable hydrogen atom there come into consideration aromatic amines as well as those which are derived from vattable compounds. Especially amines which are derived from compounds with the anthraquinone ring system are used. Such amines are, for instance, 1-amino-anthraquinone, 1 - amino - 4 - benzoylamino - anthraquinone, 1 - amino - 5 - benzoylamino-anthraquinone, 1.4-diamino-anthraquinone, 1-benzoylamino-5-amino - 4.8 - dihydroxy - anthraquinone, 5 - amino - 1.9 - anthrapyrimidine, 5 - amino - 4'-bonzoylamino - 1.1' - anthrimide - carbazole, 2 - amino - 3 - hydroxy - anthraquinone, 1 - amino - 2 - hydroxy - anthraquinone, 2 - amino - 3 - mercapto - anthraquinone, 2 - amino - 1 - mercapto - anthraquinone, 1.2 - diamino - anthraquinone, 1-alkyl(resp. aryl) - amino - 2 - amino-anthraquinone. In cases where an aminoanthraquinone is used bearing in o-position to the amino group an OH-, SH- or NHR-group (R being hydrogen, alkyl, or aryl), a ring formation takes place and an oxazole, thiazole or imidazole ring system results. The reaction of the carboxylic acid halides with the amines is carried out at an elevated temperature and in the amine itself as solvent or in the presence of an indifferent solvent such as o-dichloro-benzene, trichloro-benzene, nitro-benzene, chloro-naphthalene, or ethyl-carbazole.

In case an amino-anthraquinone is used bearing in o-position a group being capable of forming a ring with the amino group (an OH-, SH- or NHR-group) the reaction temperature reached, for instance, by working in nitrobenzene is not sufficient in order to effect the splitting off of water and ring formation. In these cases an additional heating of the first formed reaction product in a high boiling solvent as, for instance, ethyl-carbazole is necessary.

The products thus obtained are vat dyestuffs which if prepared from α-arylamino-anthraquinone-2.1-(N)-1′.2′-(N)-acridone carboxylic acids having the aryl radical in 4-position dye cotton yellowish green shades, but it prepared from the same acids having the aryl radical in 5- or 8-position dye cotton violet-brown to black-brown shades. The new dyestuffs show excellent fastness properties and in particular they are extremely fast to light. They are difficultly soluble in organic solvents but can be recrystallized from quinoline. They dissolve in concentrated sulfuric acid with brown color. The color of the vat is reddish violet to reddish brown.

This application is a divisional application of our U. S. application Ser. No. 194,602, filed March 8, 1933.

The following examples illustrate the invention, without, however, restricting it thereto, the parts being by weight.

*Example 1*

11 parts of α-amino-anthraquinone are heated in 800 parts of nitrobenzene up to 120° C.; at this temperature 24 parts of 3′.5′-dichloro-anthraquinone-2.1-(N) - 1′.2′ - (N) - benzene - acridone-4- [anilido-p-carboxylic acid chloride] are added to the solution and then stirred at 130° C., until the evolution of hydrochloric acid has ceased. The dyestuff is filtered with suction at 90° C., washed with nitrobenzene and then dried. The green dye-powder shows a Bordeaux-red color of the vat and dyes cotton green shades.

By using 1-amino-5-benzoyl-amino-anthraquinone instead of α-amino-anthraquinone a product is obtained which dyes cotton yellowish to olive green; 4-amino-1.9-anthrapyrimidine also yields an olive green dyestuff. On the other hand, when reacting the acid achloride with 4-amino-5′-chloro-anthraquinone-2.1-(N)-1′,2′-(N)-benzene-acridone, a dyestuff is obtained which dyes vegetable fiber greenish blue.

The carboxylic acid chloride used in the reaction is obtained, for example, by the condensation of 4-amino-3′-5′-dichloro-anthraquinone-2.1-(N)-1′-2′-(N)-benzene-acridone with p-bromo-benzoic acid methyl-ester in a solution of nitrobenzene and in the presence of potassium acetate and copper; the ester obtained crystallizing in blue to black needles is saponified in an alkaline medium and the carboxylic acid is transformed into the chloride by means of thionyl-chloride in trichloro-benzene at a temperature of 90–95° C.

*Example 2*

5 parts of 3′-5′-dichloro-anthraquinone-2.1-(N)-1′.2′-(N) - benzene - acridone-4-[anilido-m-carboxylic acid chloride] obtained according to Example 1 are slowly heated to boiling with 2.5 parts of α-amino-anthraquinone in 160 parts of anhydrous trichloro-benzene. When the carboxylic acid chloride is transformed the difficultly soluble dyestuff is filtered with suction at 120° C., washed with pyridine and dried. The substance crystallizing in green needles dyes cotton from the vat green shades.

*Example 3*

26 parts of 5′-chloro-anthraquinone-2.1-(N)- 1′.2′-(N)-benzene - acridone-4-[anilido - p - carboxylic acid chloride] obtainable in an analogous manner as the product of Example 1 and 12 parts of 2.3-amino-hydroxy-anthraquinone are heated to boiling for some hours in 800 parts of nitrobenzene. When the solution is still warm the dyestuff is filtered with suction, washed with nitrobenzene and then dried.

The substance being still alkali-sensitive is subsequently heated to boiling in ethyl-carbazole for a short time, the reaction mixture is diluted with pyridine and the dyestuff filtered off at 100° C. In this way the dyestuff of the following constitution

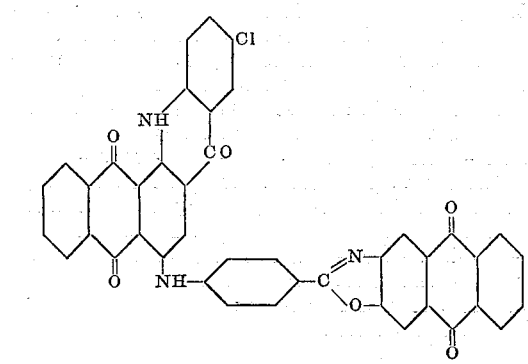

is obtained in form of beautiful green crystals, which dissolve in sulfuric acid with yellow-brown color and yield on cotton from a red-brown vat on oxidizing yellowish green shades. By using 1-amino-2-hydroxy-anthraquinone instead of 2-amino-3-hydroxy-anthraquinone the isomeric 2-1-oxazole is obtained which dyes cotton strong greenish olive shades.

By using a higher boiling solvent in the reaction instead of nitrobenzene, the pure oxazole is obtained immediately.

*Example 4*

A mixture of 13 parts of 5′-chloroanthraquinone-2.1-(N) - 1′.2′ - (N) - benzene - acridone-4- [anilido-p-carboxylic acid chloride] and 7 parts of 2-amino-3-mercapto-anthraquinone is added to 400 parts of α-chloro-naphthalene at 120–130° C., whereupon the reaction mixture is slowly heated to 260° C. At the boiling temperature green needles separate from the green solution. The solution is heated to boiling for about 30 minutes and the green dyestuff is filtered off at 110° C. After drying the dyestuff is obtained in form of a green powder which, after being crystallized from quinoline, dyes cotton from the vat yellow-green shades.

When reacting 4′-chloro-anthraquinone-2.1- (N) -1′.2′- (N) -benzene-acridone-4-[anilido-p-carboxylic acid chloride] upon 2-amino-3-mercapto-anthraquinone a thiazole is obtained which dyes cotton more bluish than the above product.

The dyestuff obtainable in the same manner which has the following constitution

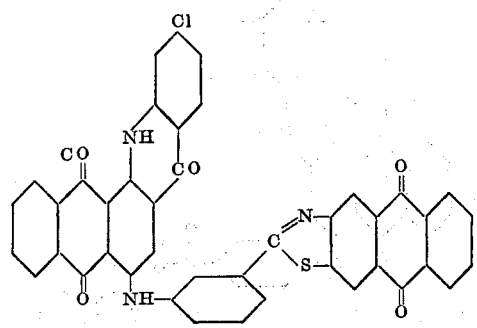

dyes cotton bluish green shades.

The thiazoles obtainable from 1-mercapto-2-amino-anthraquinone represent olive green dyestuffs.

Example 5

By causing to react 26 parts of 5'-chloro-antraquinone-2.1-(N)-1'.2'-(N)-benzene-acridone-4-[anilido-p-carboxylic acid chloride] upon 18 parts of 1-anilido-2-amino-anthraquinone in 40 parts of α-chloro-naphthalene at a temperature of 260° C. for one hour a dyestuff of the following constitution

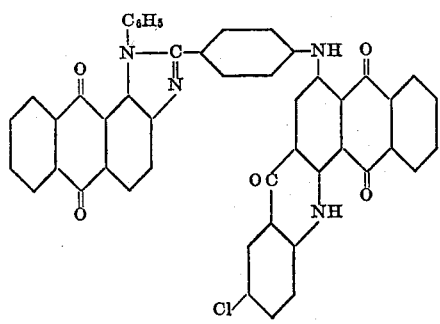

is obtained which is filtered with suction at room temperature. It can be recrystallized from nitrobenzene and dyes cotton green shades from the vat.

Example 6

27 parts of 3'.5'-dichloro-anthraquinone-2.1-(N)-1'.2'-(N)-benzene-acridone-5-[anilido-p-carboxylic acid chloride] and 12 parts of 1-amino-2-hydroxy-anthraquinone are heated to boiling for some hours in 800 parts of nitrobenzene. The dyestuff thus obtained is filtered with suction, washed with nitrobenzene and then dried.

The dyestuff is subsequently heated to boiling in ethyl-carbazole and then filtered with suction at 100° C. after being diluted with pyridine. A dyestuff of the following constitution

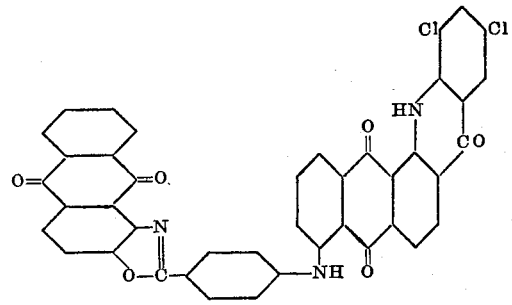

is obtained in form of red-brown needles. The dyestuff is soluble in concentrated sulfuric acid with yellow-brown color. It dyes vegetable fiber from bluish red vat black-brown shades.

By using anthraquinone-2.1-(N)-1'.2'-(N)-benzene-acridone-5-[anilido-p-carboxylic acid chloride] resp. anthraquinone-2.1-(N)-1'.2'-(N)-naphtha-acridone-5-[anilido-p-carboxylic acid chloride] instead of 3'.5'-dichloro-anthraquinone-2.1-(N)-1'.2'-(N)-benzene-acridone-5-[anilido-p-carboxylic acid chloride], dyestuffs are obtained which yield on vegetable fiber shades similar to those obtainable by the above dyestuff.

By using 1-hydroxy-2-amino-anthraquinone resp. 1-amino-2-mercapto-anthraquinone instead of 1-amino-2-hydroxy-anthraquinone, the corresponding oxazoles or thiazoles are obtained which show similar dye-properties.

By using as starting material 2-amino-3-hydroxy-anthraquinone and 3'.5'-dichloro-anthraquinone-2.1-(N)-1'.2'-(N)-benzene-acridone-5-[anilido-p-carboxylic acid chloride] products are obtained yielding greyish colors.

Example 7

55 parts of 3'.5'-dichloro-anthraquinone-2.1-(N)-1'.2'-(N)-benzene-acridone-5-[anilido-p-carboxylic acid chloride] and 25.5 parts of 1-mercapto-2-amino-anthraquinone are slowly heated in 1500 parts of chloro-naphthalene to the boiling point of chloro-naphthalene and stirred for about one hour at this temperature. The reaction product is isolated at room temperature in the usual manner.

When the reaction product is heated in ethyl-carbazole and precipitated with pyridine the dyestuff is obtained in form of black-brown needles. It dyes cotton from red-violet vat nigger-brown shades. The solution in sulfuric acid is yellow-brown.

Example 8

5 parts of 5'-chloroanthraquinone-2.1-(N)-1'.2'-(N)-benzene-acridone-4-[anilido-p-carboxylic acid chloride] and 5 parts of dehydrothio-toluidine are heated to boiling in 100 parts of nitrobenzene for about ¾ hour, whereby the corresponding acylamine crystallizing in long fine needles is obtained, hydrogen chloride being split off. The product can be worked up in the usual manner; it is soluble in sulfuric acid with yellow color and precipitates in clear green flakes after diluting the sulfuric acid solution with water.

The product can be used as pigment after suitable formation. This application is a division of our application Serial No. 194,602, filed March 8, 1938.

We claim:

1. The compounds of the formula

wherein A stands for an anthraquinone-acridone selected from the group consisting of the benz- and naphth-acridones, the Greek letter α means that the nitrogen atom is attached in alpha-position to the anthraquinone nucleus of the anthraquinone acridone ring system and R stands for a vattable p-quinoidic radical containing at least 3 condensed rings.

2. The compounds of the formula

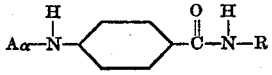

wherein A stands for an anthraquinone-acridone selected from the group consisting of the benz- and naphth-acridones, the Greek letter α means that the nitrogen atom is attached in alpha-position to the anthraquinone nucleus of the anthraquinone acridone ring system and R stands for a vattable p-quinoidic radical containing at least 3 condensed rings.

3. The compounds of the formula

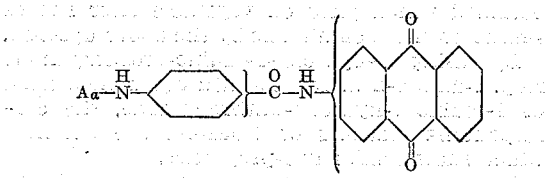

wherein A stands for an anthraquinone-acridone selected from the group consisting of the benz- and naphth-acridones, and the Greek letter α means that the nitrogen atom is attached in alpha-position to the anthraquinone nucleus of the anthraquinone-acridone ring system.

4. The compound of the following formula

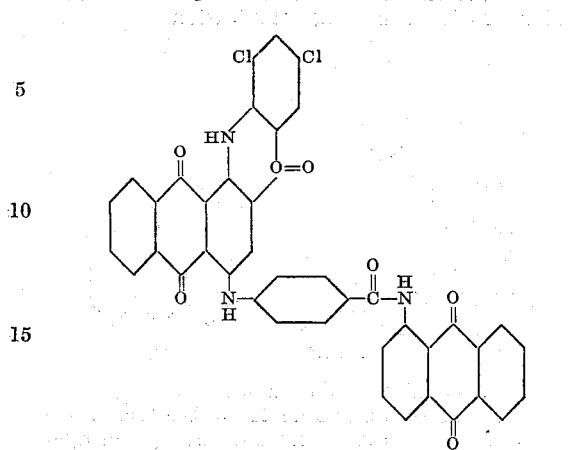

FRITZ BAUMANN.
HEINZ-WERNER SCHWECHTEN.